United States Patent [19]
Udd

[11] Patent Number: 5,591,965
[45] Date of Patent: Jan. 7, 1997

[54] MULTIPARAMETER SENSOR SYSTEM USING A MULTIPLE GRATING FIBER OPTIC BIREFRINGENT FIBER

[76] Inventor: Eric Udd, 2555 NE. 205th Ave., Troutdale, Oreg. 97060

[21] Appl. No.: 438,025

[22] Filed: May 8, 1995

[51] Int. Cl.$^6$ .................................................. H01J 5/16
[52] U.S. Cl. .............................. 250/227.18; 250/227.14; 356/32
[58] Field of Search .................... 250/227.18, 227.14, 250/227.16, 227.23, 227.21; 356/32, 33, 365–368; 372/102–105; 385/11, 14, 132

[56] References Cited

U.S. PATENT DOCUMENTS

| | | | |
|---|---|---|---|
| 4,761,073 | 8/1988 | Meltz et al. | 356/32 |
| 5,319,435 | 6/1994 | Melle et al. | 356/32 |
| 5,380,995 | 1/1995 | Udd et al. | 250/227.18 |
| 5,399,854 | 3/1995 | Dunphy et al. | 250/227.17 |
| 5,426,297 | 6/1995 | Dunphy et al. | 250/227.23 |
| 5,469,265 | 11/1995 | Measures et al. | 356/32 |

OTHER PUBLICATIONS

M. G. Xu, H. Geiger and J. P. Dakin, "Multiplexed Point and Stepwise–Continuous Fibre Grating Based Sensors: Practical Sensor for Structural Monitoring?" Proc. of SPIE, vol. 2294, pp. 69–80, Jul. 1994.

W. W. Morey, "Distributed Fiber Grating Sensors", Proceedings of the Seventh Optical Fibre Sensors Conference, pp. 285–288, Sydney, Australia, Dec. 1990.

R. M. Measures et. al., "Structurally Integrated Fiber Optic Strain Rosette", Proc. of SPIE, vol. 986, pp. 32–42, Sep. 1988.

E. Udd et. al., "Application of the Sagnac Interferometer Based Strain Sensor for Earth Movement Detection System", Proc. of SPIE, vol. 2191, pp. 126–136, Feb. 1994.

M. G. Xu et al., "Discrimination between strain and temperature effects using dual wavelength fiber gratings", Electronics Letters, vol. 30 pp. 1085–1087, Jun. 1994.

*Primary Examiner*—Edward P. Westin
*Assistant Examiner*—Que T. Le
*Attorney, Agent, or Firm*—George W. Finch

[57] ABSTRACT

Spectrally separated fiber gratings are written in substantially the same location of a birefringent optical fiber to form a multiparameter environmental sensor. This sensor is particularly useful for the measurement of three axes of strain and temperature at a single location in composite material. This is possible due to the splitting of each of the dual overwritten fiber gratings via the birefringence of the optical fiber resulting in four spectral outputs and four equations that may be solved to determine the two transverse strains, the longitudinal strain and the temperature. This invention also describes systems that may be used to demodulate the multiparameter fiber gratings.

20 Claims, 4 Drawing Sheets

MULTIPARAMETER SENSOR SYSTEM USING A MULTIPLE GRATING FIBER OPTIC BIREFRINGENT FIBER

BACKGROUND OF THE INVENTION

There is the need to measure environmental parameters to high accuracy with sensors that are light in weight, nonobtrusive, insensitive to electromagnetic interference and capable of withstanding extreme conditions including wide temperature extremes, large shocks and vibration. Applications for these sensors include the emerging area of smart structures where sensors are used to monitor environmental parameters that are used to augment manufacturing, perform nondestructive evaluation, implement health monitoring systems for structures and augment control systems. These structures need to be able to continuously monitor their condition in real time. They must be able to operate over extremely long times with low power. The sensors used to support these structures must be capable of accurately measuring small changes in environmental signals and still be able to maintain wide dynamic range capabilities.

Fiber optic gratings have been proposed for fiber optic sensors that have the potential to meet many of these requirements. The fiber gratings are constructed by doping the core of an optical fiber with material such as germania. When exposed to light the index of refraction of the optical core of silica based fiber with appropriate core dopants have been observed to have a modified index of refraction. By using phase masks or interfering laser beams it has been demonstrated that it is possible to produce multiple variations in the index of refraction along the length of the fiber core producing an internal grating structure. Adjusting the spacing of the period during formation of the fiber grating changes its spectral transmission and reflection characteristics.

When a fiber grating is exposed to an environmental effect such as strain, temperature, pressure, or vibration the length of the optical fiber is changed and consequently the period of the fiber grating. As an example W. W. Morey reports in "Distributed Fiber Grating Sensors", Proceedings of the Seventh Optical Fiber Sensors Conference, p. 285–288, Sydney, Australia, December 1990 that typical temperature changes are 0.0043 nm/degree C. at 833 nm for Andrew PM fiber and 0.0074 nm/degree C. for Corning FlexCore fiber at 824 nm. When the fiber is strained the length of the fiber also changes. Bragg wavelength changes were measured by Morey to result in a shift of $5.2\times10^{-4}$ nm per microstrain at 820 nm.

For many applications it is necessary to measure both temperature and strain simultaneously. E. Udd and T. E. Clark, in "Fiber Optic Grating Sensor Systems for Sensing Environmental Effects", U.S. Pat. No. 5,380,995 describe how using two overlaid fiber gratings at different wavelengths such as 1.3 and 1.5 microns may be used to measure two environmental parameters such as strain and temperature at a single point. Recently M. G. Xu, H. Geiger and J. P. Dakin, in "Multiplexed Point and Stepwise-Continuous Fibre Grating Based Sensors: Practical Sensor for Structural Monitoring?", Proceedings of SPIE, volume 2294, p. 69–80, 1994 have also demonstrated the simultaneous measurement of strain and temperature using 1.3 and 0.85 microns wavelengths and overlaid fiber gratings for point measurements. In order to make complete measurements of strain internal to a structure it is often necessary to measure all three strain components. R. M. Measures, D. Hogg, R. D. Turner, T. Valis and M. J. Giliberto, in "Structurally Integrated Fiber Optic Strain Rosette", Proceedings of SPIE, volume 986, p. 32–42, 1988 demonstrated a fiber optic strain rosette consisting of three separate fiber sensors. Because these fiber sensors are not collocated and because means to compensate for temperature fluctuation were not employed these rosettes have been of very limited use. There is a continuing need to measure other environmental effects such as transverse strain at a single point and to integrate such fiber grating sensors into practical and economical sensor systems that can be manufactured using available components.

BRIEF DESCRIPTION OF THE PRESENT INVENTION

In the present invention sensor systems are constructed using one or more fiber gratings that are used to measure environmental effects, primarily strain, temperature and acoustic pressure so that the sense and magnitude of the environmental effect may be determined. These systems can be used to support health monitoring systems for aircraft, spacecraft, land vehicles, buildings, bridges and other civil structures. They can also be used to support the mechanical testing of materials prior to their incorporation into structures and could be used to measure deformations in natural structures as well to provide data to study earthquakes, slides and other earth movement as reported by E. Udd, R. G. Blom, D. M. Tralli, E. Saaski, and R. Dokka, in "Applications of the Sagnac Interferometer Based Strain Sensor to an Earth Movement Detection System", Proceedings of SPIE, volume 2191, p. 126–136, 1994.

Each of the sensor systems disclosed uses a relatively broadband or scanning light source, one or more fiber gratings written into birefringent optical fiber, such as a multimode optical fiber to act as sensors or local reflectors and or spectral filters. The fiber gratings are positioned so that changes in the spectral reflectivity and transmissions of the fiber gratings may be compared to determine multiple environmental effects.

The present system can be used to simultaneously measure and continuously monitor many individual sensors placed along a fiber length. This enables the detection and accurate measurement of both the sense and environmental effect on each sensor.

A normal fiber grating is sensitive to temperature, transverse strain and longitudinal strain effects. Transverse strain effects are particularly important when the fiber sensors are embedded into materials subject to loading such as advanced organic and metallic composite structures. In U.S. Pat. No. 5,380,995 by E. Udd and T. E. Clark a dual overlaid fiber grating operating at two distinct wavelengths is used to measure temperature and strain simultaneously. This system works well provided the strain is primarily in the longitudinal direction along the length of the optical fiber. If transverse strains are also involved then errors in the longitudinal strain may result. This invention uses dual overlaid fiber gratings written at two distinct wavelengths into birefringent fiber such as polarization preserving fiber to generate four equations in four unknowns to enable the measurement of four environmental parameters such as all three axes of strain and temperature. These sensors may be separated sufficiently in wavelength that multiple three axis strain and temperature sensors may be multiplexed along a single optical fiber.

Therefore it is an object of the invention to provide a multiparameter fiber grating sensor system capable of measuring four parameters at a single point.

Another object of the invention is to provide multiparameter fiber grating sensors capable of measuring two axes of transverse strain, longitudinal strain and temperature simultaneously.

Another object of the invention is to provide a sensor system that can provide multiparameter sensing at a single point under extreme environmental conditions including temperature of more than 700 degree C. under severe shock and vibration loading.

Another object of the invention is to provide multiplexed multiparameter fiber grating sensors along a single optical fiber.

Another object of the invention is to produce a four parameter sensing element using just two overlaid fiber gratings minimizing fabrication costs.

These and other objects and advantages of the present invention will become apparent to those skilled in the art after considering the following detailed specifications and the accompanying sheets of drawings wherein:

DETAILED DESCRIPTION OF THE SHOWN EMBODIMENTS

Figure 1:
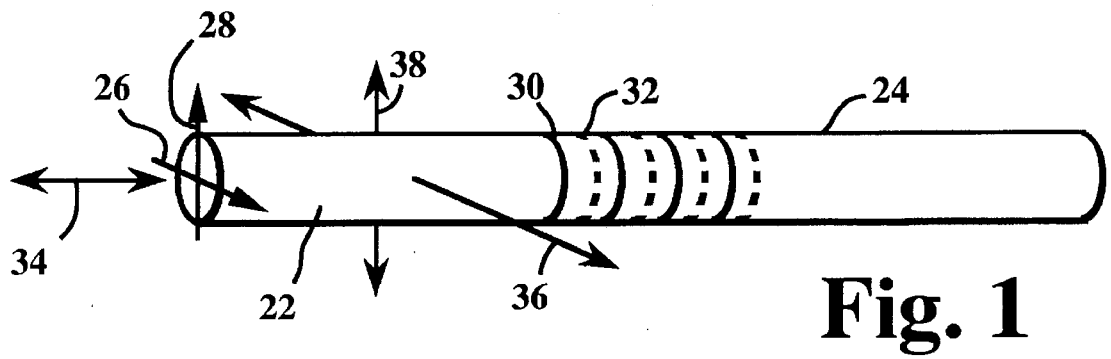
FIG. 1 is a diagram illustrating the layout and performance of a birefringent optical fiber with dual fiber gratings overwritten in the same location with separated wavelengths.
Figure 2:
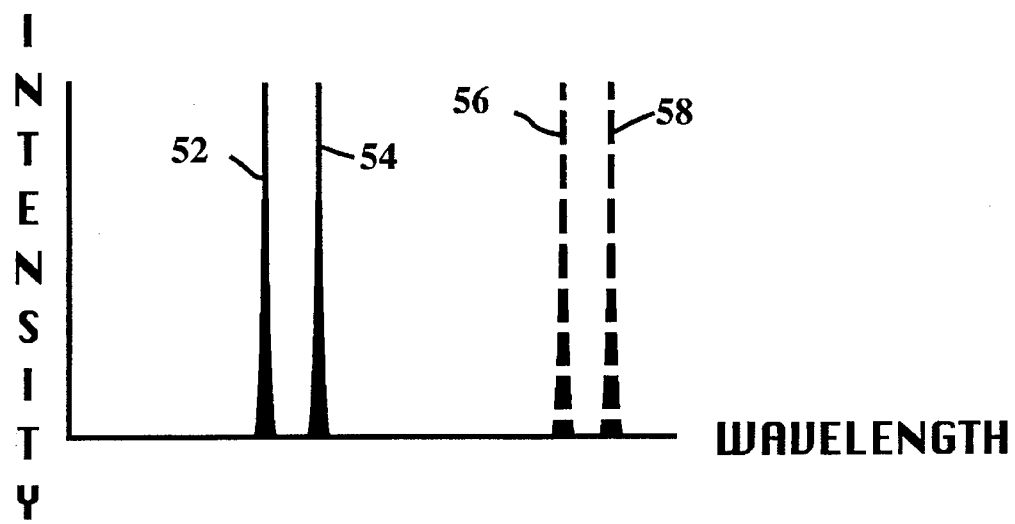
FIG. 2 is a graph illustrating the spectral reflections from a birefringent optical fiber with dual overlaid fiber gratings at separated wavelengths illuminated by a broadband light source.

Referring to the drawings more particularly by reference numbers, number 22 in FIG. 1 refers to a multiparameter fiber grating sensor that when used in combination with a spectral demodulator can be used to measure transverse and longitudinal strain as well as temperature. The sensor 22 consists of a length of birefringent optical fiber 24 with birefringent axes 26 and 28 having index of refraction's $n_1$ and $n_2$ respectively. Two overlaid fiber gratings 30 and 32 are written onto the birefringent fiber 24 centered about wavelengths at $\lambda_1$ and $\lambda_2$ respectively. Each of the fiber gratings 30 and 32 that are written into the birefringent optical fiber 24 produce a pair of spectral reflections and transmissions when illuminated by a broadband light source. FIG. 2 shows the spectral reflections due to the fiber grating 30 at $\lambda_1$, 52 which corresponds to the spectral reflection of the fiber grating 30 formed along the polarization axis 26 and at a wavelength $\lambda_{11}$ and 54 which corresponds to the spectral reflection of fiber grating 30 formed along the polarization axis 28 and at a wavelength $\lambda_{12}$. In FIG. 2 the spectral reflections due to the fiber grating 32 at $\lambda_2$ are shown as 56 corresponding to the spectral reflection of the fiber grating 32 along the polarization axis 26 and at a wavelength $\lambda_{21}$ and 58 corresponding to the spectral reflection of the fiber grating 32 along the polarization axis 28 and at a wavelength $\lambda_{22}$.

Referring back to FIG. 1, when the multiparameter fiber sensor 22 is subject to a longitudinal strain or compression 34 along its axis the fiber gratings 30 and 32 expand or contract causing a spectral shift of the reflections 52, 54, 56 and 58 that may be measured to determine the longitudinal strain. By having two separated wavelengths for the fiber grating 30 and 32, respectively $\lambda_1$ and $\lambda_2$ temperature changes as well as longitudinal strain may be measured as taught in U.S. Pat. No. 5,380,995 and reported by M. G. Xu, H. Geiger and J. P. Dakin, in "Multiplexed Point and Stepwise-Continuous Fibre Grating Based Sensors: Practical Sensor for Structural Monitoring?", Proceedings of SPIE, Vol. 2294, pp. 69–80, 1994. Unlike the prior art the multiparameter fiber sensor 22 is also capable of measuring transverse strain or compression components 36 and 38 at a single location. When the fiber sensor 22 is subject to transverse strain or compression 36 the index of refraction along the axis 26 will decrease or increase respectively resulting in a shift in the spectral reflections 52 and 56. Similarly when the fiber sensor 22 is subject to transverse strain or compression 38 the result will be a shift in the spectral reflections 54 and 58. By measuring these shifts with a spectral demodulator two more equations are developed that depend on transverse strain. These two equations in combination with the two equations used to measure longitudinal strain or compression 34 and temperature are then used to form four equations with four unknowns namely transverse strain or compression along the polarization axis 26, transverse strain or compression along the polarization axis 28, longitudinal strain or compression 34 and temperature. These four equations which consist of the four unknowns and measured spectral shifts are then solved resulting in the four outputs to the system. Specifically these equations are $$\Delta\lambda_{11}=K_{11}\Delta\epsilon_1+K_{21}\Delta\epsilon_2+K_{31}\Delta\epsilon_3+K_{41}\Delta T \tag{1}$$

$$\Delta\lambda_{12}=K_{12}\Delta\epsilon_1+K_{22}\Delta\epsilon_2+K_{32}\Delta\epsilon_3+K_{42}\Delta T \tag{2}$$

$$\Delta\lambda_{21}=K_{13}\Delta\epsilon_1+K_{23}\Delta\epsilon_2+K_{33}\Delta\epsilon_3+K_{43}\Delta T \tag{3}$$

$$\Delta\lambda_{22}=K_{14}\Delta\epsilon_1+K_{24}\Delta\epsilon_2+K_{34}\Delta\epsilon_3+K_{44}\Delta T \tag{4}$$

where the coefficients $K_{i,j}$, i=1–3 and j=1–4 are functions of the photoelastic coefficient, the Poisson's ratio of the fiber and the effective index of refraction of the birefringent optical fiber 24 along the axes 26 and 28. The coefficients $K_{4j}$ for j=1–4 are determined by the thermal expansion coefficient and the thermooptic coefficient. $\Delta\lambda_{11}$, $\Delta\lambda_{12}$, $\Delta\lambda_{21}$ and $\Delta\lambda_{22}$ are the measured spectral shifts. $\Delta\epsilon_1$, $\Delta\epsilon_2$, and $\Delta\epsilon_3$ are the change in longitudinal strain or compression 34, the change in transverse strain or compression 36 and the change in transverse strain or compression 38. $\Delta T$ is the change in temperature.

Figure 3:
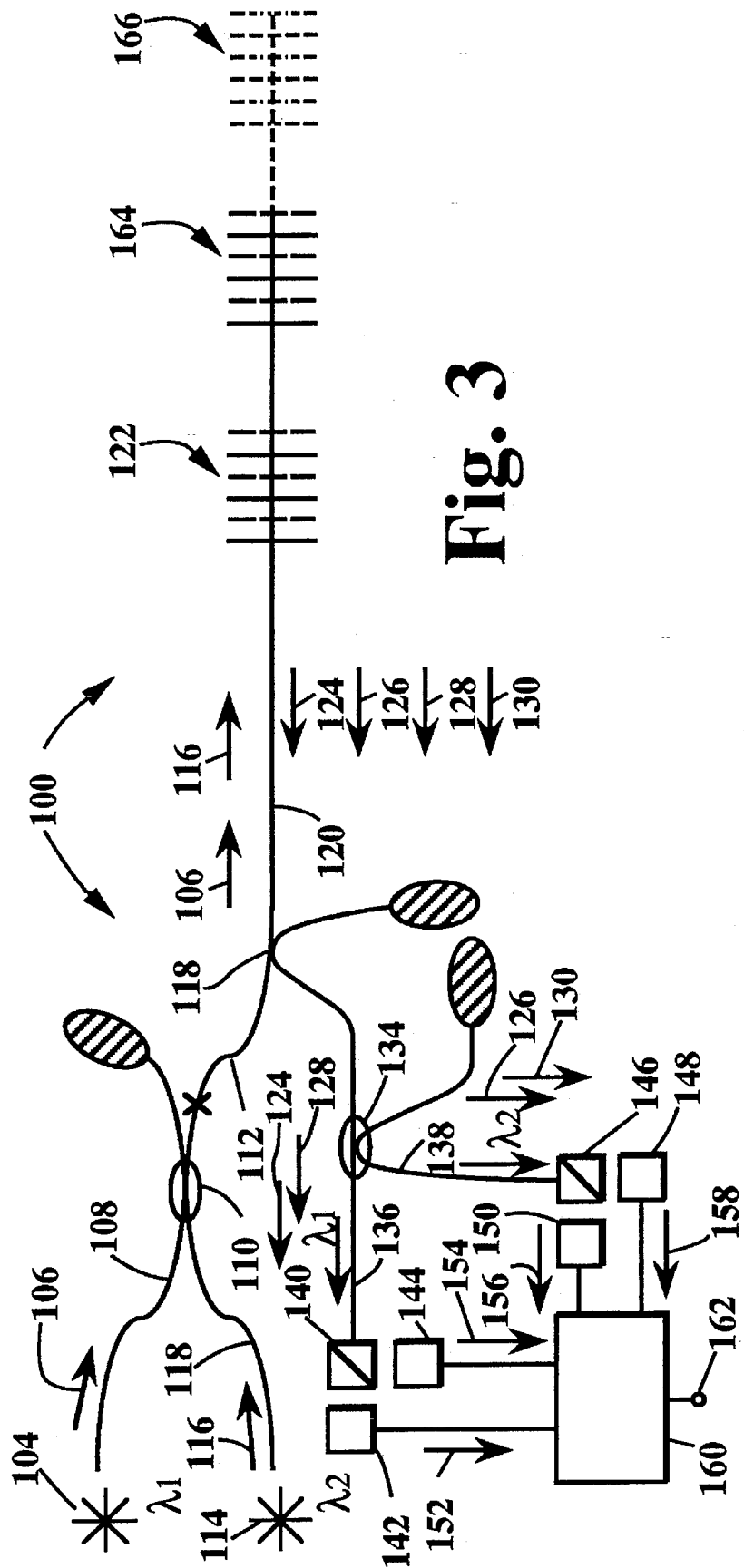
FIG. 3 is a diagram of how a system can be configured using a dual wavelength overlaid fiber grating sensor in birefringent fiber using polarization preserving fiber and polarization controlling components.

FIG. 3 illustrates an embodiment 100 of the multiparameter fiber optic grating sensor system that uses polarization control as its primary means of separating the spectral reflections from multiparameter fiber grating sensors similar to that described in association with FIGS. 1 and 2. A spectrally broad or spectrally scanning light source 102 is used to couple light into the system. The light source 102 may consist of a broadband light source such as a light emitting diode or fiber laser or a relatively narrow band scanning light source such as a tunable laser diode. The light source 102 could also consist of multiple light sources to cover different regions of the spectral regions that are combined using wavelength division multiplexing techniques. In the dual light source approach shown in FIG. 3 a light source 104 is centered about the wavelength $\lambda_1$ and couples the light beam 106 into the optical fiber 108. The light source 104 could be a light emitting diode of a fiber laser and for best performance it should generate light that is not highly polarized. The light beam 106 then enters the wavelength division multiplexed element 110 that is designed to cross couple light centered about $\lambda_1$ and the light beam 106 is directed into the optical fiber leg 112 of the wavelength division multiplexing element 110. A second light source 114 that may consist of a broadband light source such as a light emitting diode or fiber laser or a relatively narrow band scanning light source such as a tunable laser diode centered about the wavelength $\lambda_2$ is used to couple the light beam 116 into the optical fiber 118. For best performance the light source 114 should not be highly polarized to insure that both polarization axes of the multiparameter fiber grating sensor are well illuminated. The light beam 116 then enters the wavelength division multiplexing element 110 which is designed to pass light centered about $\lambda_2$ straight through. The light beam 116 then enters the fiber segment 112 that is designed to be polarization preserving with two birefringent axes. The light beams 106 and 116 then pass through a polarization preserving beamsplitter 118 that directs a portion of the light beams 106 and 116 into the fiber lead 120 and onto the first multiparameter fiber grating sensor 122. The sensor 122 consists of two overlaid fiber gratings at $\lambda_a$ and $\lambda_b$ that are written into a section of birefringent fiber that in this case has its polarization axes aligned with respect to the polarization preserving fiber 120. Four light beams 124, 126, 128 and 130 corresponding to the wavelengths $\lambda_{a1}$, $\lambda_{a2}$, $\lambda_{b1}$, and $\lambda_{b2}$ result from spectral reflections from the multiparameter fiber grating sensor 122. These light beams reflect back via the fiber 120 to the beamsplitter 118 and a portion of these light beams are directed into the fiber 132. The light beams 124, 126, 128 and 130 then continue on to the wavelength division multiplexing beamplitter 134. The wavelength division multiplexing beamsplitter 134 splits the light beams 124 and 128 which are near the wavelength $\lambda_1$ into the fiber leg 136. The wavelength division multiplexing beamsplitter 134 splits the light beams 126 and 130 which are near the wavelength $\lambda_2$ into the fiber leg 138. The light beams 124 and 128 enter the polarizing beamsplitter 140 that is oriented so that light beam 124 passes onto the spectral detector 142 and light beam 128 passes onto spectral detector 144. The spectral detectors 142 and 144 may be Fabry-Perot etalons, tunable acoustooptical filters, fiber gratings or bulk spectral filters in combination with optical detectors for converting optical to electrical signals. The light beams 126 and 130 pass through the polarizing beamsplitter 146 oriented so that the light beam 126 passes through the polarizing beamsplitter onto the spectral detector 148 and the light beam 130 is directed to the spectral detector 150. The electrical outputs 152, 154, 156 and 158 from the spectral detectors 142, 144, 148 and 150 are directed to the signal processor 160 which solves the four equations in four unknowns and determines the outputs that may be three axes of strain and temperature. A second multiparameter fiber grating sensor 164 may be placed in the same fiber line 120. The wavelengths of the dual overlaid fiber gratings should be chosen to be outside the expected operational band of the multiparameter fiber grating sensor 162. In a similar manner additional multiparameter fiber gratings such as 166 may be placed along the same fiber line 120. By pulsing the light source 102 and using time division multiplexing techniques additional multiparameter fiber gratings using the same operational bands as 122, 164 and 166 may be placed along the fiber line 120.

In the case of the system 100 described in association with FIG. 3 it is important to maintain polarization control to accurately separate out the signals. This would then entail the usage of relatively expensive components including substantial lengths of polarization preserving fiber, polarizing beamsplitters, and wavelength division multiplexing elements that maintain polarization states. It is however possible to design a simpler, potentially much more cost effective system by realizing that the birefringence of polarization preserving fiber that is commercially available is sufficiently high that all four optical spectral components of the multiparameter fiber grating sensor may be easily separated by precision spectral filters such as scanning fiber Fabry-Perot spectral filters which are commercially available from Queensgate and Micron Optics, or tunable acoustooptic filters commercially available from New Focus and Alenia. As an example consider the case of two overwritten fiber gratings at 1300.0 nm and 1550.0 nm written onto a birefringent optical fiber with a beat length of 2 mm. This would then establish a multiparameter fiber grating sensor with the four effective fiber gratings at approximately 1300.0 nm, 1300.65 nm, 1550.0 nm and 1550.78 nm. The important point to note is that the pair at about 1300 nm are separated by 0.65 nm and the pair at 1550 are separated by 0.78 nm. Since systems may be designed using fiber gratings with full width half maximum spectral widths of 0.2 nm and precision spectral filters such as fiber Fabry-Perot and acoustooptic tunable filters that have resolution of better than 0.01 nm these separations are more than enough to provide very clean signals. This spectral separation eliminates the need for many of the polarization dependent elements shown in FIG. 3 allowing the usage of low cost components developed in association with conventional fiber optic telecommunications and the optoelectronics industry.

Figure 4:
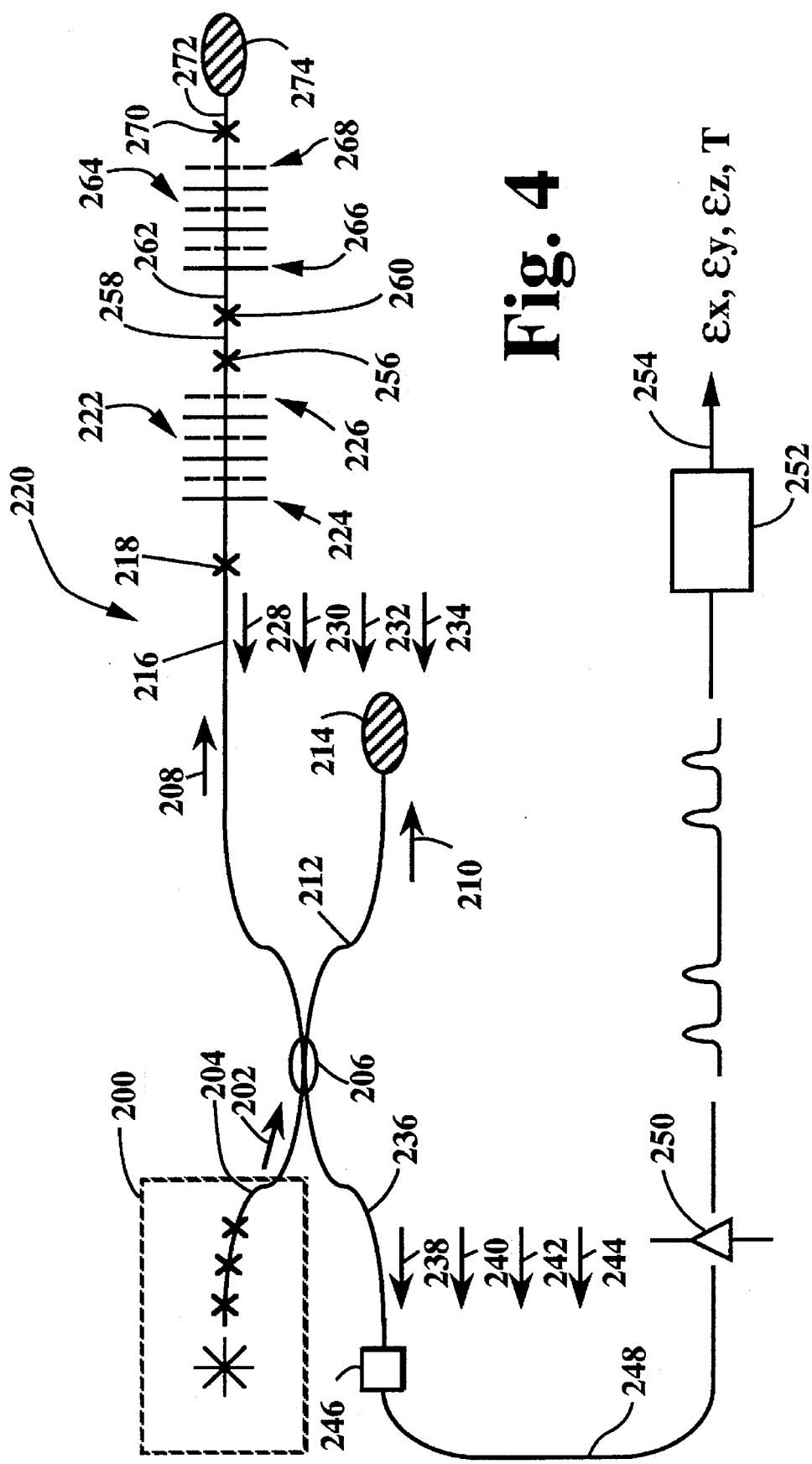
FIG. 4 is a diagram illustrating a system configured using broadband or tunable light sources, primarily low cost conventional telecommunication grade optical fiber with birefringent fiber used to support multiparameter fiber grating sensors and a spectral demodulator.

FIG. 4 illustrates an embodiment of this type. A light source 200 which could be a tunable light source or a broadband light source with sufficient spectral range to cover the spectral operating region of the multiparameter fiber gratings used in the system is used to launch a light beam 202 into the optical fiber lead 204 which may be conventional telecommunication grade optical fiber. For optimum operation of the system the light source should be capable of generating a light beam 202 that is at least partially depolarized or capable of scanning through a complete cycle of polarization states so that the multiparameter fiber grating sensors may be interrogated efficiently. The light beam 202 then enters a fiber beamsplitter 206 which splits the light beam 202 into two light beams 208 and 210. The light beam 210 enters the fiber leg 210 which may be conventional telecommunication grade optical fiber and propagates to the fiber end 214 which is designed to cause the light beam 212 to exit the system while minimizing back reflection. Alternatively the fiber leg 212 and light beam 210 could be used to support additional fiber grating sensors. The light beam 208 is directed into the fiber leg 216 which may be conventional telecommunication grade optical fiber. The light beam 208 then passes the fiber splice or connector 218 and enters the birefringent optical fiber 220 which contains the multiparameter fiber grating sensor 222 consisting of the dual overlaid fiber gratings 224 and 226 that are separated in wavelength and because the birefringence of the fiber 220 result in four effective gratings 224a, 224b, 226a and 226b with a and b denoting the two birefringent axes of the birefringent fiber 220. From each of the effective gratings 224a, 224b, 226a and 226b a portion of the light beam 208 is reflected resulting in the light beams 228, 230, 232 and 234 propagating out of the fiber 220, past the fiber splice or connector 218 and back through the central beamsplitter 206 where a portion of each of the light beams 228, 230, 232 and 234 is directed into the fiber leg 236. These light beams 238, 240, 242 and 244 pass though the fiber leg 236 and onto a spectral filter 246 which may be fiber gratings, a scanning fiber Fabry-Perot filter, an acoustooptic tunable filter or a bulk dielectric filter. The optical output from the spectral filter 246 is then directed onto the detector 250 directly or via an optical fiber 248. The electrical output from the detector 250 is directed into a signal processor 252 which calculates the multiple environmental parameters to be measured by the multiparameter fiber grating sensor 222 and results in an output 254 that may be three axes of strain and temperature. The portion of the light beam 208 that is not reflected by the multiparameter fiber grating 222 continues on to the fiber splice or connector 256, passes through a section of optical fiber 258 that may be conventional telecommunication grade optical fiber and past the fiber splice or connector 260 and into the length of birefringent fiber 262. The length of birefringent fiber 262 contains a multiparameter fiber grating 264 that consists of two overwritten fiber gratings 266 and 268 that are written at wavelengths that are offset from those in the multiparameter fiber grating sensor 222. The reflected light beams from the multiparameter fiber grating 264 propagate back through the system and are processed in manner similar that of the light beams 228, 230, 232 and 234. The light beam 208 continues to propagate through the fiber 262 beyond the multiparameter fiber grating sensor 264 and the fiber splice or connector 270 to the fiber 272 where it may continue on to additional multiparameter fiber gratings or other fiber sensors before reaching the end of the fiber 274 that may be terminated to reduce back reflection. By pulsing the light source 200 and using time division multiplexing techniques more than one multiparameter fiber grating can operate in the same spectral band allowing greater numbers of these sensors to be multiplexed along a single optical fiber.

Figure 5:
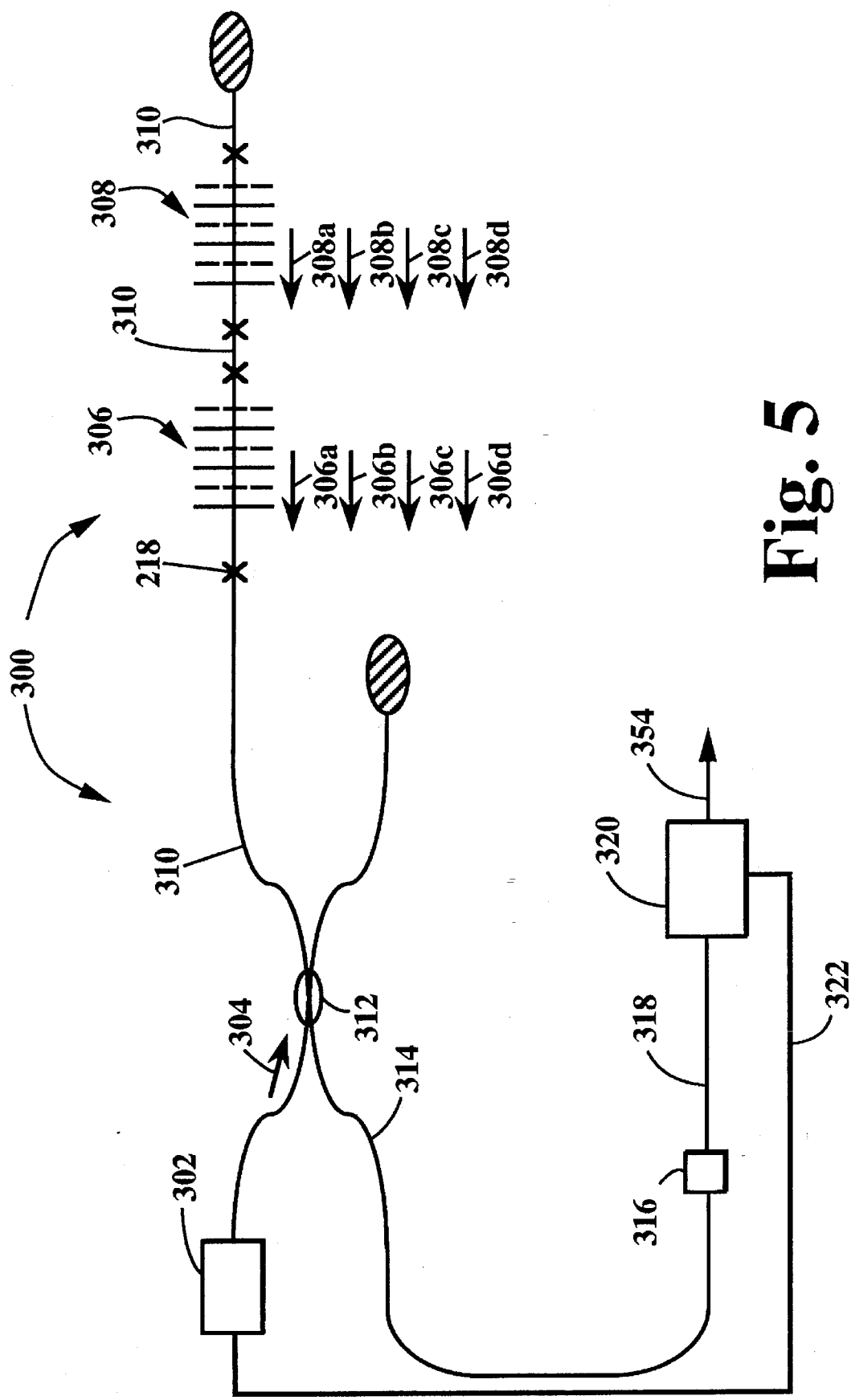
FIG. 5 is a diagram illustrating a system using a tunable relatively narrow band light source that can be used to determine the spectral response of multiparameter fiber grating sensors.

FIG. 5 illustrates a system 300 that employs a narrow band scanning light source 302. In this case the light beam 304 is tuned over the spectral range of the multiparameter fiber grating sensors 306 and 308 and their reflections 306a, 306b, 306c, 306d, 308a, 308b, 308c and 308d propagate back through the fiber 310 and a portion of these beams are directed by the beamsplitter 312 into the optical fiber leg 314 and onto the output detector 316. The electrical output 318 from the detector is then feed into the signal processor 320 that controls the scan of the light source 302 via the electrical connection 322 and converts the signals 318 into outputs corresponding to the parameters measured by the multiparameter fiber grating sensors 306 and 308 which may be three axes of strain and temperature. By pulsing the light source 302 and using time division multiplexing techniques in the signal processor 320, such as gating the detector 318, additional multiparameter fiber grating sensors may be added along the single optical fiber line.

Thus there has been shown and described novel multiparameter fiber grating sensor systems which fulfill all the objects and advantages sought therefor. Many changes, modifications, variations, uses and applications of the subject invention will however become apparent to those skilled in the art after considering this specification and the accompanying drawings. All such changes, modifications, alterations and other uses and applications which do not depart from the spirit and scope of the invention are deemed to be covered by the invention which is limited only by the claims that follow.

What is claimed is:

1. A fiber grating sensor to sense at least one environmental effect, said sensor including:
   a birefringent optical fiber for subjection to environmental effects having:
      X, Y, and Z optical axes;
      a first internal grating pattern comprised of:
         areas having different indices of refraction whose instantaneous positions relative to each other are affectable by environmental effects on each of said optical axes of said birefringent optical fiber to vary the spectral reflectance and transmittance of said first internal grating pattern along each of said optical axes; and
      a second internal grating pattern in substantially the same location as said first internal grating pattern comprised of:
         areas having different indices of refraction whose instantaneous positions relative to each other are affectable by environmental effects on each of said optical axes of said birefringent fiber to vary the spectral reflectance and transmittance of said second internal grating pattern along each of said optical axes.

2. The fiber grating sensor with as defined in claim 1 wherein said birefringent optical fiber is a single mode polarization preserving optical fiber.

3. The fiber grating sensor with as defined in claim 1 wherein said birefringent optical fiber has stress induced birefringence.

4. The fiber grating sensor with as defined in claim 1 wherein said birefringent optical fiber has an elliptical core.

5. The fiber grating sensor with as defined in claim 1 wherein said birefringent optical fiber is single mode optical fiber.

6. The fiber grating sensor with as defined in claim 1 wherein said birefringent optical fiber is multimode optical fiber.

7. A sensor system to sense environmental effects, said system including:
   a light source producing a first light beam;
   a first birefringent fiber grating sensor connected to receive said first light beam and positioned for exposure to environmental effects, said first birefringent fiber grating sensor having:
      X, Y, and Z optical axes;
      a first internal grating pattern comprised of:
         first areas having different indices of refraction whose instantaneous positions relative to each other are affectable by the environmental effects to instantly change a band of frequencies reflected by said first birefringent fiber grating sensor along each optical axis of said optical fiber creating second and third light beams whose frequency spectrum depends on the environmental effects; and
      a second internal grating pattern comprised of:
         second areas having different indices of refraction whose instantaneous positions relative to each other are affectable by the environmental effects to instantly change a band of frequencies reflected by said first birefringent fiber grating sensor along each optical axis of said optical fiber creating fourth and fifth light beams whose frequency spectrum depends on the environmental effects; and detector means positioned to receive said second, third, fourth and fifth light beams and to produce therefrom first, second, third and fourth electrical signals representative of the environmental effects.

8. The sensor system as defined in claim 7 further including:

a first beamsplitter having:
 a first portion connected to receive said first light beam from said light source;
 a second portion connected to said first fiber grating sensor for conducting said first light beam to said first fiber grating sensor; and
 a third portion connected to said first local optical spectral filter for conducting said second, third, fourth and fifth light beams from said first fiber grating sensor to said first local optical spectral filter.

9. The sensor system as defined in claim 7 wherein said light source includes:

a spectrally broadband light source.

10. The sensor system as defined in claim 7 wherein said light source includes:

a first light emitting diode emitting a first light beam having a first spectral range into a first optical fiber; and a second light emitting diode emitting a second beam of light having a first spectral range that differs from said first spectral range into said second optical fiber, said system further including:

a first wavelength division multiplexing element positioned to receive said first and second light beams and combine said first and second light beams into a third light beam.

11. The sensor system as defined in claim 7 where the first optical spectral filter is a tunable Fabry-Perot etalon.

12. The sensor system as defined in claim 7 where the first optical spectral filter is a tunable acoustooptical filter.

13. The sensor system as defined in claim 7 where the first optical spectral filter is a fiber grating.

14. The sensor system as defined in claim 7 further including:

a second birefringent fiber grating sensor similar to said first birefringent fiber grating sensor reflecting frequencies that are different from frequencies reflected by said first birefringent fiber grating sensor.

15. The sensor system as defined in claim 7 wherein said light source is pulsed and said first detector is gated so that time division multiplexing may be used to multiplex additional birefringent fiber grating sensors with said first birefringent fiber grating sensor.

16. A sensor system to sense environmental effects including:

a spectrally tunable light source producing a first light beam;

a first fiber grating sensor connected to receive said first light beam and positioned for exposure to the environmental effects, said first fiber grating sensor being constructed from a birefringent fiber having:

a first internal grating pattern comprised of:
 first areas having different indices of refraction whose instantaneous positions relative to each other are affectable by the environmental effects to instantly determine a band a frequencies reflected by said first fiber grating sensor along each birefringent axis of the optical fiber creating second and third light beams whose frequencies spectrum depends on the environmental effects; and a second internal grating pattern comprised of:
 second areas having different indices of refraction whose instantaneous positions relative to each other are affectable by the environmental effects to instantly determine a band a frequencies reflected by said first fiber grating sensor along each birefringent axis of the optical fiber creating fourth and fifth light beams whose frequencies spectrum depends on the environmental effects; and first detector means to receive said second, third, fourth and fifth light beams and to produce therefrom first, second, third and fourth electrical signals representative of the environmental effects.

17. The sensor system as defined in claim 16 further including:

a first beamsplitter including:
 a first portion connected to receive said first light beam from said spectrally tunable light source;
 a second portion connected to said first fiber grating sensor for conducting said first light beam to said first fiber grating sensor; and
 a third portion connected to conduct said second, third, fourth and fifth light beams from said first fiber grating sensor to said first detector means.

18. The sensor system as defined in claim 16 further including:

an electronic processor that controls the scan of said spectrally tunable light source and processes the first, second, third and fourth electrical signals from said first detector means.

19. The sensor system as defined in claim 16 further including:

a second fiber grating sensor similar to said first fiber grating sensor, connected to receive said first light beam and positioned for exposure to the environmental effects, said second fiber grating sensor reflecting frequencies different than those reflected by said first fiber grating sensor.

20. The sensor system as defined in claim 19 wherein said said first and second fiber grating sensors with differing spectral reflectances are spatially spaced to allow time division multiplexing.

* * * * *